United States Patent
Medeiros De Amorim et al.

(10) Patent No.: US 12,549,248 B2
(45) Date of Patent: Feb. 10, 2026

(54) MANAGING OF SATELLITE ASSISTANCE INFORMATION DURING HANDOVER PROCEDURE

(71) Applicant: Nokia Technologies Oy, Espoo (FI)

(72) Inventors: Rafhael Medeiros De Amorim, Aalborg (DK); Mads Lauridsen, Aalborg (DK); Erika Portela Lopes De Almeida, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/078,663

(22) Filed: Mar. 13, 2025

(65) Prior Publication Data
US 2025/0211325 A1    Jun. 26, 2025

Related U.S. Application Data (63) Continuation of application No. PCT/EP2023/074905, filed on Sep. 11, 2023.

(30) Foreign Application Priority Data

Sep. 29, 2022 (FI) ...................................... 20225862

(51) Int. Cl.
*H04W 36/00* (2009.01)
*H04B 7/185* (2006.01)
(Continued)

(52) U.S. Cl.
CPC ....... *H04B 7/18541* (2013.01); *H04L 5/0053* (2013.01); *H04W 36/249* (2023.05); *H04W 74/0833* (2013.01)

(58) Field of Classification Search
CPC ............. H04B 7/18541; H04L 5/0053; H04W 36/249; H04W 74/0833; H04W 36/0072; H04W 36/0064
See application file for complete search history.

(56) References Cited

U.S. PATENT DOCUMENTS 11,082,903 B2   8/2021 Yun et al.
2018/0324768 A1*  11/2018 Shaheen ............... H04L 5/0053
(Continued)

FOREIGN PATENT DOCUMENTS

| WO | 2021/058186 A1 | 4/2021 | |
| WO | WO-2021219322 A1 * | 11/2021 | ........ H04W 36/083 |
| WO | 2022/091037 A1 | 5/2022 | |

OTHER PUBLICATIONS

3GPP TSG RAN WG1#109-e, R1-2203289 Title: Maintenance on Solution for NR to support non-terrestrial network (NTN). (Year: 2022).*

(Continued)

*Primary Examiner* — Faruk Hamza
*Assistant Examiner* — Abusayeed M Haque
(74) *Attorney, Agent, or Firm* — Lippes Mathias LLP (57) ABSTRACT

There is provided an apparatus comprising: at least one processor; and at least one memory storing instructions that, when executed by the at least one processor, cause the apparatus at least to perform: receiving, from a serving cell, a configuration message for a handover to a target cell associated with a different satellite assistance information than satellite assistance information associated with the serving cell, wherein the configuration message is indicative of at least: the satellite assistance information associated with the target cell; and a validity timer for defining validity of at least part of the satellite assistance information; wherein the satellite assistance information comprises at least: an epoch time and corresponding satellite assistance information, which is to be applied after reaching the epoch time; determining, based on at least the epoch time, whether to modify a handover timer and/or one or more requirements on handover completion.

16 Claims, 7 Drawing Sheets

(51) Int. Cl.
*H04L 5/00* (2006.01)
*H04W 36/24* (2009.01)
*H04W 74/0833* (2024.01)
*H04W 84/06* (2009.01)

(56) References Cited

U.S. PATENT DOCUMENTS

| | | | | |
|---|---|---|---|---|
| 2020/0153500 | A1* | 5/2020 | Kim | H04B 17/318 |
| 2020/0259896 | A1* | 8/2020 | Sachs | H04L 67/12 |
| 2020/0367080 | A1* | 11/2020 | Salah | H04W 72/1273 |
| 2021/0136641 | A1 | 5/2021 | Roy et al. | |
| 2022/0232447 | A1 | 7/2022 | Lu et al. | |
| 2024/0056170 | A1* | 2/2024 | Shrestha | H04W 56/0005 |
| 2024/0063894 | A1* | 2/2024 | Vogedes | H04B 7/18504 |
| 2024/0284194 | A1* | 8/2024 | Lee | H04B 7/18504 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.1.0, Jun. 2022, pp. 1-1128.

"3rd Generation Partnership Project; Technical Specification Group Radio Access Network; NR; NR and NG-RAN Overall Description; Stage 2 (Release 17)", 3GPP TS 38.300, V17.1.0, Jun. 2022, pp. 1-209.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)", 3GPP TS 36.300, V17.1.0, Jun. 2022, pp. 1-401.

"3rd Generation Partnership Project; Technical Specification Group Radio Access Network; NR; Requirements for support of radio resource management (Release 17)", 3GPP TS 38.133, V17.6.0, Jun. 2022, 3635 pages.

"LTE; Evolved Universal Terrestrial Radio Access (E-UTRA); Requirements for support of radio resource management (3GPP TS 36.133 version 17.6.0 Release 17)", ETSI TS 136 133, V17.6.0, Sep. 2022, 3979 pages.

Sattarzadeh et al., "Satellite-Based Non-Terrestrial Networks in 5G: Insights and Challenges", IEEE Access, vol. 10, Dec. 22, 2021, pp. 11274-11283.

International Search Report and Written Opinion received for corresponding Patent Cooperation Treaty Application No. PCT/EP2023/074905, dated Dec. 12, 2023, 17 pages.

"Maintenance on Solutions for NR to support non-terrestrial networks (NTN)", 3GPP TSG RAN WG1 #109-e, R1-2203289, Agenda: 8.4, Panasonic, May 9-20, 2022, 7 pages.

"Discussion on remaining issues", 3GPP TSG-RAN2 #118, R2-2205240, Agenda: 6.10.2.1, LG Electronics Inc, May 9-20, 2022, 5 pages.

"Report of [AT119-e][105][IoT-NTN] RRC corrections (Huawei)—Second Round", 3GPP TSG RAN WG2 #119-e, R2-2208756, Agenda: 7.2.3, Huawei, Aug. 17-29, 2022, 23 pages.

* cited by examiner

MANAGING OF SATELLITE ASSISTANCE INFORMATION DURING HANDOVER PROCEDURE

FIELD

Various example embodiments relate to managing of satellite assistance information during handover procedure.

BACKGROUND

Handover procedures are used to provide mobility in wireless communication systems. Handover procedures may be used for example in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to handover procedures. According to the discussions there is a need to provide enhanced methods, apparatuses and computer programs related to joint channel estimation in cellular communication networks. Such enhancements may also be beneficial in other wireless communication networks, such as in non-terrestrial networks (NTNs), and 6G networks in the future, as well.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a an aspect, there is provided a method comprising: receiving, by a user equipment from a serving cell, a configuration message for a handover to a target cell associated with a different satellite assistance information than satellite assistance information associated with the serving cell, wherein the configuration message is indicative of at least: the satellite assistance information associated with the target cell; and a validity timer for defining validity of at least part of the satellite assistance information; wherein the satellite assistance information comprises at least: an epoch time and corresponding satellite assistance information, which is to be applied after reaching the epoch time; determining, by the user equipment based on at least the epoch time, whether to modify a handover timer and/or one or more requirements on handover completion.

According to an embodiment, the method comprises: determining that the epoch time is a time point in the past; and based on the determining that the epoch time is the time point in the past, determining whether the satellite assistance information is valid.

According to an embodiment, the method comprises: detecting that the satellite assistance information is not valid; based on detecting that the satellite assistance information is not valid, receiving updated satellite assistance information with a second epoch time; and modifying the handover timer by: starting the handover timer at the second epoch time; or extending the handover timer; and/or modifying the one or more requirements on handover completion by: relaxing a handover delay requirement and/or interruption time requirement; and/or modifying a starting time of measurement of a handover delay and/or an interruption time.

According to an embodiment, the method comprises: initiating a random access procedure with the target cell using a resource allocated in the configuration, which is a later resource in time than a first resource, which is the earliest resource in time of the allocated resources.

According to an embodiment, the method comprises: detecting that the satellite assistance information is valid; based on detecting that the satellite assistance information is valid, determining not to modify the handover timer and/or the one or more requirements on handover completion.

According to an embodiment, the method comprises: determining that the epoch time is a time point between a starting time of processing of the configuration message and the end of a processing delay of the configuration message; based on determining that the epoch time is the time point between the starting time of processing of the configuration message and the end of the processing delay of the configuration message, detecting that the satellite assistance information is valid; and determining not to modify the handover timer and/or the one or more requirements on handover completion.

According to an embodiment, the method comprises: determining that the epoch time is a time point after the end of a processing delay of the configuration message; based on determining that the epoch time is the time point after the end of the processing delay of the configuration message, modifying the handover timer by: starting the handover timer at the epoch time; or extending the handover timer; and/or modifying the one or more requirements on handover completion by: relaxing a handover delay requirement and/or interruption time requirement; and/or modifying a starting time of measurement of a handover delay and/or an interruption time.

According to an embodiment, the relaxing the handover delay requirement comprises adding a time value to the handover delay requirement; and/or wherein the relaxing the interruption time requirement comprises adding a time value to the interruption time requirement.

According to an embodiment, the method comprises: initiating a random access procedure with the target cell using a first resource allocated in the configuration, wherein the first resource is the earliest available resource in time of the allocated resource(s).

According to an embodiment, the configuration message is indicative of random access channel configuration comprising a first resource and a second resource, which is later resource in time than the first resource.

According to an aspect, there is provided an apparatus comprising means for performing the method according to the aspect above and the embodiments thereof. The means may comprise at least one processor; and at least one memory storing instructions that, when executed by the at least one processor, cause the performance of the apparatus. The apparatus may be a user equipment.

According to an aspect, there is provided a computer program comprising instruction, which, when executed by an apparatus, cause the apparatus to perform at least the method of the aspect above and the embodiments thereof.

According to an aspect, there is provided a (non-transitory) computer readable medium comprising instructions that, when executed by an apparatus, cause the apparatus to perform at least the method of the aspect above and the embodiments thereof.

According to an aspect, there is provided a method, comprising: receiving, by an apparatus from a target cell associated with a different satellite assistance information than satellite assistance information associated with the apparatus, an acknowledgement for a handover request, wherein the acknowledgement is indicative of at least: a random access channel configuration comprising a first resource and optionally a second resource, which is later resource in time than the first resource; a satellite assistance information associated with the target cell; and a validity timer for defining validity of at least part of the satellite assistance information; wherein the satellite assistance information comprises at least: an epoch time and corresponding satellite assistance information, which is to be applied after reaching the epoch time; transmitting, to a user equipment served by the apparatus, a configuration message for a handover to the target cell, wherein the configuration message is indicative of at least: the random access channel configuration; the satellite assistance information; and the validity timer. For example, the method may be performed by a network node, such as a source cell or serving cell, or by a control device configured to control the functioning thereof, when installed therein.

According to an aspect, there is provided an apparatus comprising means for performing the method according to the aspect above. The means may comprise at least one processor; and at least one memory storing instructions that, when executed by the at least one processor, cause the performance of the apparatus. The apparatus may be a network node, such as a source cell or serving cell.

According to an aspect, there is provided a computer program comprising instruction, which, when executed by an apparatus, cause the apparatus to perform at least the method of the aspect above.

According to an aspect, there is provided a (non-transitory) computer readable medium comprising instructions that, when executed by an apparatus, cause the apparatus to perform at least the method of the aspect above.

According to an aspect, there is provided a method, comprising: transmitting, by an apparatus to a serving cell associated with a different satellite assistance information than satellite assistance information associated with the apparatus, an acknowledgement for a handover request, wherein the acknowledgement is indicative of at least: a random access channel configuration comprising a first resource and optionally a second resource, which is later resource in time than the first resource; a satellite assistance information associated with the target cell; and a validity timer for defining validity of at least part of the satellite assistance information; wherein the satellite assistance information comprises at least: an epoch time and corresponding satellite assistance information, which is to be applied after reaching the epoch time; monitoring a random access request from a user equipment previously served by the serving cell. For example, the method may be performed by a network node, such as a target cell, or by a control device configured to control the functioning thereof, when installed therein.

According to an embodiment, the method comprises: detecting that a random access request has been received on a first resource, wherein the first resource is the earliest resource of the allocated resource(s); releasing one or more later resources in the allocated resources.

According to an embodiment, the method comprises: detecting that a random access request has not been received on the first resource; based on the detecting that a random access request has not been received on the first resource, monitoring a random access request on the second resource.

According to an aspect, there is provided an apparatus comprising means for performing the method according to the aspect above and the embodiments thereof. The means may comprise at least one processor; and at least one memory storing instructions that, when executed by the at least one processor, cause the performance of the apparatus. The apparatus may be a network node, such as a target cell.

According to an aspect, there is provided a computer program comprising instruction, which, when executed by an apparatus, cause the apparatus to perform at least the method of the aspect above and the embodiments thereof.

According to an aspect, there is provided a (non-transitory) computer readable medium comprising instructions that, when executed by an apparatus, cause the apparatus to perform at least the method of the aspect above and the embodiments thereof.

BRIEF DESCRIPTION OF THE DRAWINGS

Some example embodiments will now be described with reference to the accompanying drawings.

DETAILED DESCRIPTION

A user equipment may receive a configuration for a handover from a source cell to a target cell. The cells may be associated with different satellite assistance information. Before successfully executing the handover to the target cell, the UE may need to make sure it has valid satellite assistance information for the target cell. It may take time to acquire the valid satellite assistance information, which may cause, for example, that a timer, e.g. T304 timer, expires before a successful handover, or one or more requirements for a handover will not be met. For example, interruption time requirement or handover delay requirement might not be met in time. Methods are provided for modifying the timer and/or modifying the requirements for the handover on certain conditions, which will be explained in the description. For example, the timer may be delayed or extended, and/or the requirements may be relaxed so that the UE will have valid satellite assistance information for completion of the handover.

For example, a handover timer may be increased or extended until the UE has valid satellite assistance information. Alternatively, the starting time of the timer may be postponed until the UE has valid satellite assistance information.

For example, interruption time requirement may be modified by relaxing, e.g. by enlarging or extending, the interruption time to encompass re-acquisition of a new valid satellite assistance information by the UE. Alternatively, the starting point of the measurement of the interruption time may be postponed until the UE has valid satellite assistance information.

For example, handover delay requirement may be modified by relaxing the requirement, for example, by enlarging or extending the requirement until UE has valid satellite assistance information. Alternatively, the starting point of the measurement of the handover delay may be postponed.

Figure 1:
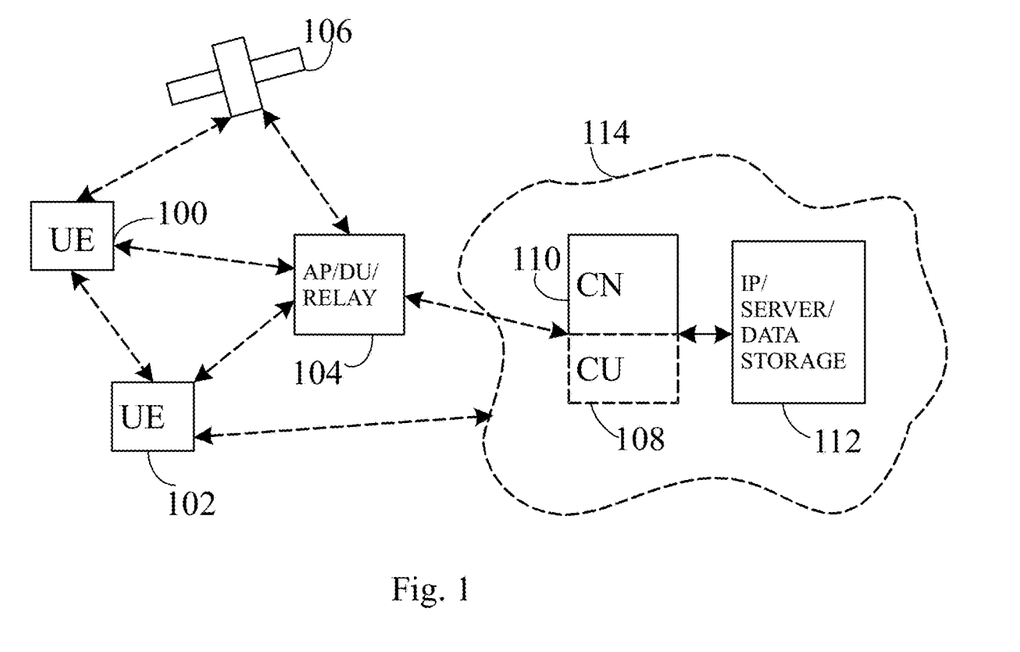
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UEs) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

Non-terrestrial network (NTN) as a term may be considered to cover a network involving non-terrestrial flying objects, such as satellites. In non-terrestrial networks (NTN), experienced delays, e.g. their range and variation rate, in the physical layer may be different than those observed for terrestrial applications. In general, because the UE 100, 102 may be located hundreds, or even several thousands, of kilometres away from the network 104, the distance range from UEs to a same serving satellite 106 radiating the network signal is much larger.

For example, for LEO networks the variation rate can be very high, as the satellite is travelling at high speeds, e.g. at speeds as high as 7500 m/s. Because of this, more advanced mechanisms to deal with UL timing alignment of the different UEs have been developed, in order to achieve more robust timing advance procedure.

For Non Terrestrial Networks (NTN), several agreements have been made respective to the long delays experienced by the UE due to the large distances to the satellite. For example, the delays may be above the limits that may be corrected via 5G NR common signalling. Agreements have also been made in support of corrective frequency Doppler measures, introduced due to high satellite speeds.

For example, in NR NTN, the UE is able to derive based on its global navigation satellite system (GNSS) implementation at least one of: its position; or a reference time and frequency. Based on at least one of these elements, and together with additional information on e.g. serving satellite ephemeris and/or timestamp signalled by the network, the UE may compute timing and frequency, and apply timing advance (TA) and frequency adjustment at least for UE in radio resource control (RRC) idle or inactive mode.

As another example, in NR NTN, the UE in RRC idle or inactive mode may be required to at least support UE specific TA calculation based at least on its GNSS-acquired position and the serving satellite ephemeris.

Validity duration of satellite assistance information may be configured per cell and indicated to the UE. Value range may be, for example, {5, 10, 15, 20, 25, 30, 35, 40, 45, 50, 55, 60, 120, 180, 240}, and the validity duration may be given in seconds.

The satellite assistance information may be valid from epoch time T to T+D, wherein the D is the validity duration, or duration of a validity timer. For example, the ephemeris may be valid from T to T+D.

It may be expected that the UE will be precluded to perform uplink transmissions, if no valid satellite assistance information, e.g. ephemeris, is available at the UE side.

In a handover procedure, network changes, or hands over, connection of a UE from a source cell to a target cell based on measurement reports from the UE to the network. For example, the link quality of the serving cell may have degraded due to movement of the UE, and the link quality of another cell may have improved. The UE is configured to perform measurements regarding the link quality of a plurality of cells, and report the measurements to the network. The network may perform a handover decision based on the measurement reports from the UE.

For NR over NTN, as well as for eMTC over NTN, the handover procedure may be complicated for the UE because of the validity timer requirements and interruption time requirements. For example, requirements for a maximum interruption time may be specified by a network, and in some cases, the validity timer may expire before a successful handover.

A source cell and a target cell may be broadcast by the same satellite or by different satellites. When broadcast by the same satellite, satellite assistance information may be used for both cells. Serving cell satellite assistance information may be given in NTN configuration. Satellite assistance information may comprise, for example, a validity timer, ephemeris information, timing advance parameters, Koffset, Kmac, polarization information, and/or common delay.

When broadcast by the same satellite, the satellite assistance information transmitted to the source cell may still be different than the satellite assistance information transmitted to the target cell, because a single satellite may have different feeder links, which may be associated with different satellite assistance information.

When broadcast by different satellites, or when the target cell and the source cell are associated with different satellite assistance information, the UE may be required to acquire synchronization in terms of time-frequency aligned uplink transmission towards the target satellite, i.e. satellite broadcasting the target cell, before initiating random access channel (RACH) procedure. Thus, the UE may be required to acquire satellite assistance information for the target satellite before the handover may be completed. This may increase the interruption time, which is the time without transmissions by the UE during handover execution.

Satellite assistance information comprises at least an epoch time and an ephemeris. Ephemeris describes the satellite's position and movement in space. The epoch time defines a point in time, when the UE may consider the ephemeris to be valid. The epoch time defines a first point in time, e.g. T, when the satellite assistance information is valid for the UE. The satellite assistance information remains valid for a duration D of a validity timer. Thus, the satellite assistance information is valid from T to T+D. For example, the ephemeris may be valid from T to T+D. At least part of the satellite assistance information is to be applied after reaching the epoch time.

The UE might not be allowed to transmit to the network without valid ephemeris, because the UE uses the ephemeris to determine the time and frequency adjustment of uplink transmissions.

Figure 2:
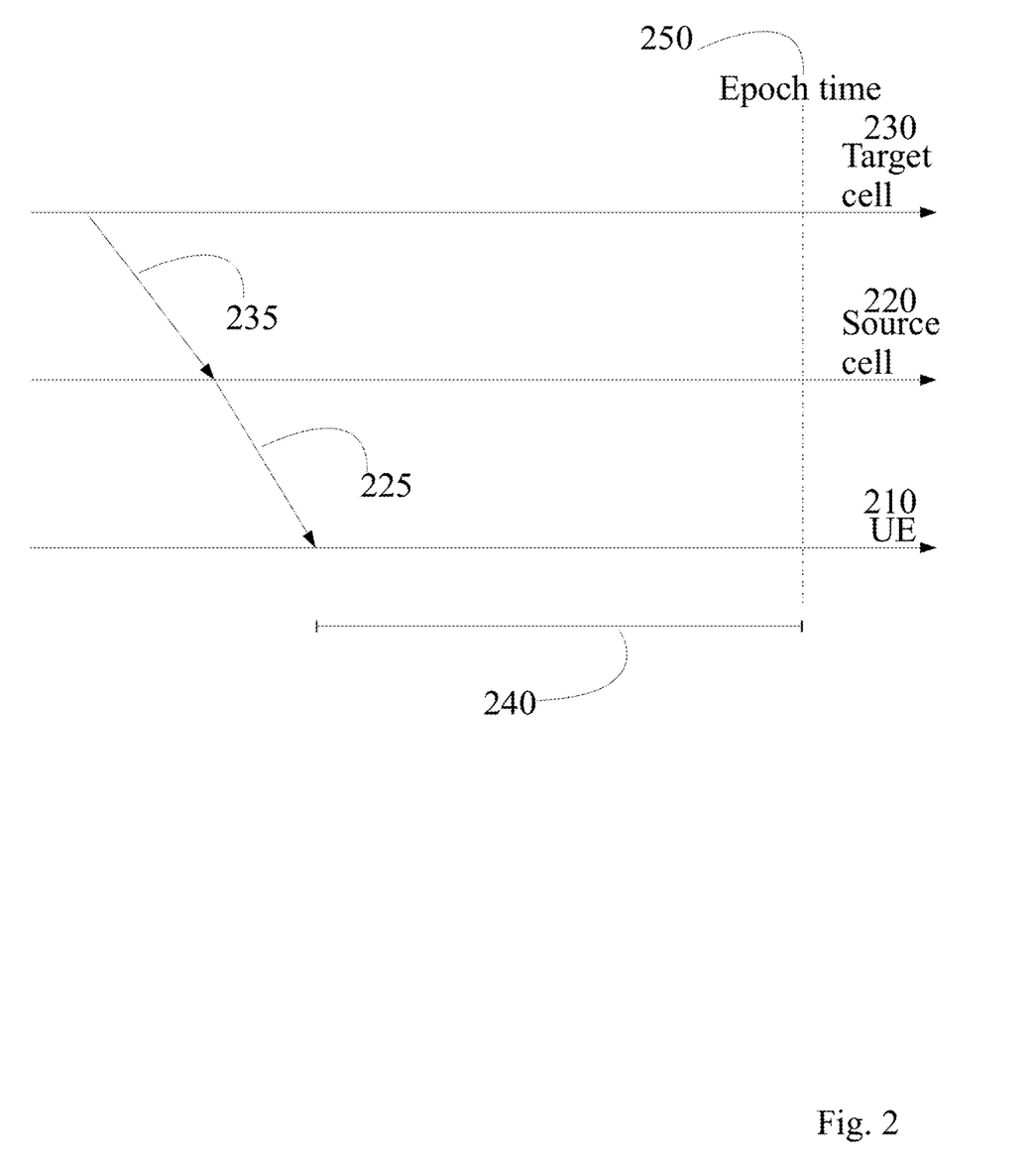
FIG. 2 shows, by way of example, a scenario of a handover procedure.

FIG. 2 shows, by way of example, a scenario of a handover procedure. A target cell 230 and a source cell 220 are associated with different satellites and may be connected to different gateways on the ground. Time advances from left to right. A target cell 230 transmits an acknowledgement 235 to a handover (HO) request to a source cell 220. The acknowledgement message may comprise the system information block comprising the satellite assistance information of the target cell 230. Thus, the acknowledgement message may comprise information on satellite assistance information associated with the target cell 230. For example, the satellite assistance information may comprise an epoch time 250.

The source cell 220 transmits radio resource control (RRC) reconfiguration 225 to the UE 210. The configuration message comprises at least the satellite assistance information with epoch time 250. When the UE 210 receives the configuration, the content, e.g. the SIB transmitted by the target cell along with the HO request acknowledgement, may have aged dozens or hundreds of ms.

The epoch time 250 is far ahead in the future in the example of FIG. 2, which may incur long waiting times before the UE is able to complete the handover command, because the UE should not apply the ephemeris information before the epoch time is reached. A large time interval 240 may be required for synchronization during which the UE is not able to connect to the target cell 230.

After reception of the configuration 225, UE 210 may start a timer, for example a T304 timer. If the handover is successful, the T304 timer is stopped. If the T304 timer expires before a successful completion of random access to the target cell 230, the UE may initiate RRC re-establishment procedure. If the T304 timer expires before the epoch time, the handover will fail because the UE might not be able to start the RACH procedure before the epoch time. After expiry, the UE may start re-establishment procedure and start a timer, for example a T311 timer. If the connection to the source cell 220 is still good, the UE may successfully perform the re-establishment procedure. Otherwise, at T311 expiry, the UE enters in idle mode, that is, enters a mode without connection to the network and may perform cell selection. In NTN, a failure of the re-establishment to the source cell is likely, because the source cell is moving away due to the satellite movement.

Upon receiving the handover configuration message, the UE is expected to fullfil requirements for handover completion, such as interruption time requirement and handover delay requirement.

The handover delay requirement represents the maximum time interval after which the UE shall be ready to start transmission on a new uplink PRACH (physical random access channel) after receiving the handover command.

The interruption time represents the maximum interruption interval on uplink transmission, between the time the UE starts executing the handover and the time the UE starts transmission of the new PRACH.

Figure 3:
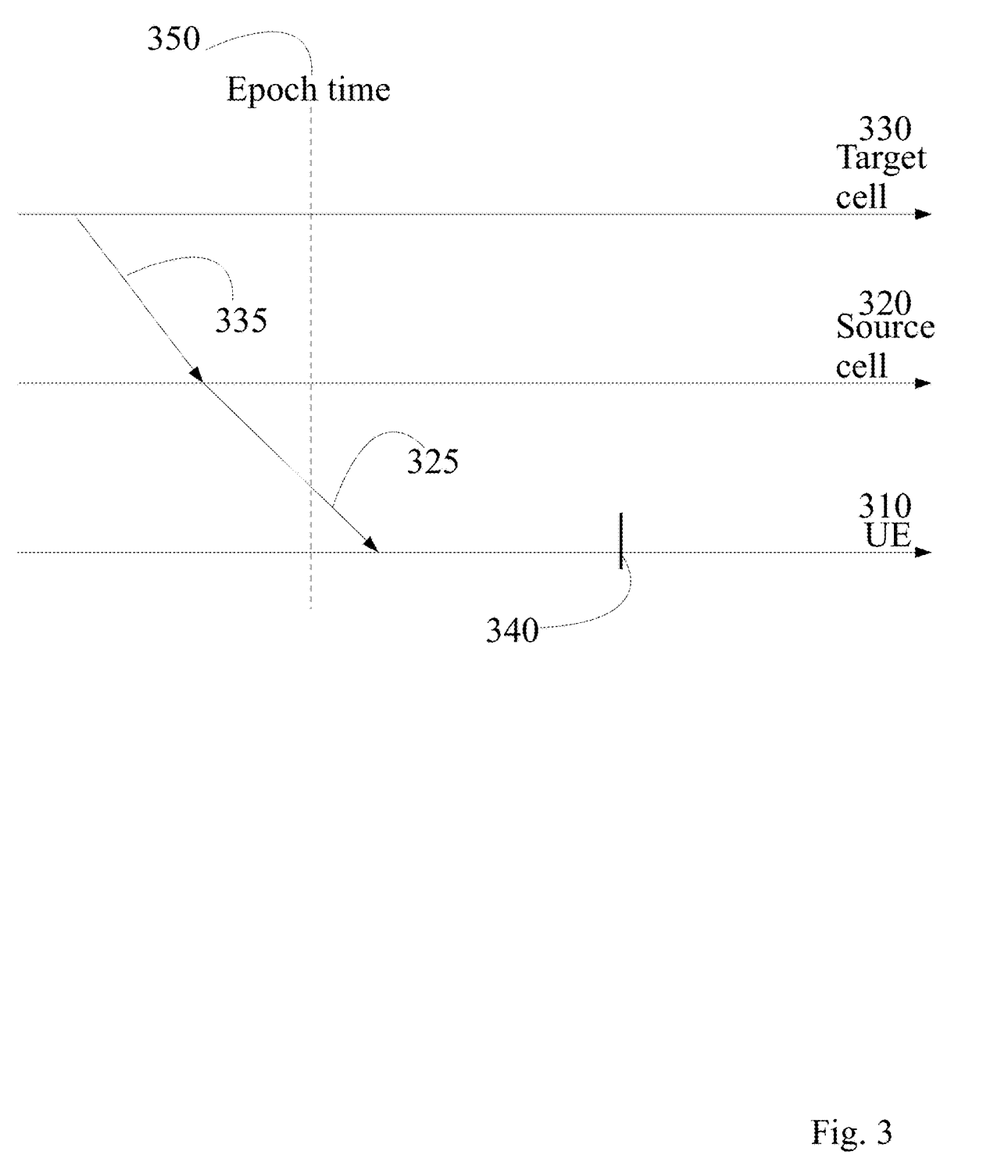
FIG. 3 shows, by way of example, a scenario of a handover procedure.

FIG. 3 shows, by way of example, a scenario of a handover procedure. A target cell 330 and a source cell 320 are associated with different satellites and may be connected to different gateways on the ground. Time advances from left to right. A target cell 330 transmits an acknowledgement 335 to a handover (HO) request to a source cell 320. The acknowledgement message may comprise the system information block comprising the satellite assistance information of the target cell 330. Thus, the acknowledgement message may comprise information on satellite assistance information associated with the target cell 330. For example, the satellite assistance information may comprise an epoch time 350.

The source cell 320 transmits radio resource control (RRC) reconfiguration 325 to the UE 310. The configuration message comprises at least the satellite assistance information with epoch time 350. When the UE receives the configuration, the content, e.g. the SIB transmitted by the target cell along with the HO request acknowledgement, may have aged dozens or hundreds of ms.

The epoch time 350 has already been reached in the example of FIG. 3, when the UE 310 receives the configuration message 325, due to large delays in signalling the HO request acknowledgement 335 message and the configuration message 325. UE 310 has not had the opportunity to start the validity timer and update the synchronization procedures. Thus, the UE might not be able to use the ephemeris information anymore, and the UE is not able to initiate the random access procedure to the target cell. A contention free reserved random access opportunity 340 may have been assigned for the UE 310, but UE is not able to use it, because it does not have a running validity timer.

If the epoch has already passed, the satellite assistance information may be considered to be valid from a later point in time than the epoch time until the end of the validity timer, when initiated from the original epoch time. In that case, the duration of the validity would be shorter than given by the validity timer. Using epoch times in the past to start a validity timer may be referred to as using non-causal epoch times. Even if the validity timer could be started in the example of FIG. 3, the validity timer may expire before the UE has had the chance to use the random access resources, e.g. contention free reserved random access (CFRA) resources 340, to access the target cell. This may especially be the case for conditional handovers (CHO), wherein the UE is allowed to decide to perform handover when given conditions are met. There may be delays in fulfilling the conditions, and the network might not be able to predict when the CHO conditions or triggers will be met at the UE side.

Figure 4:
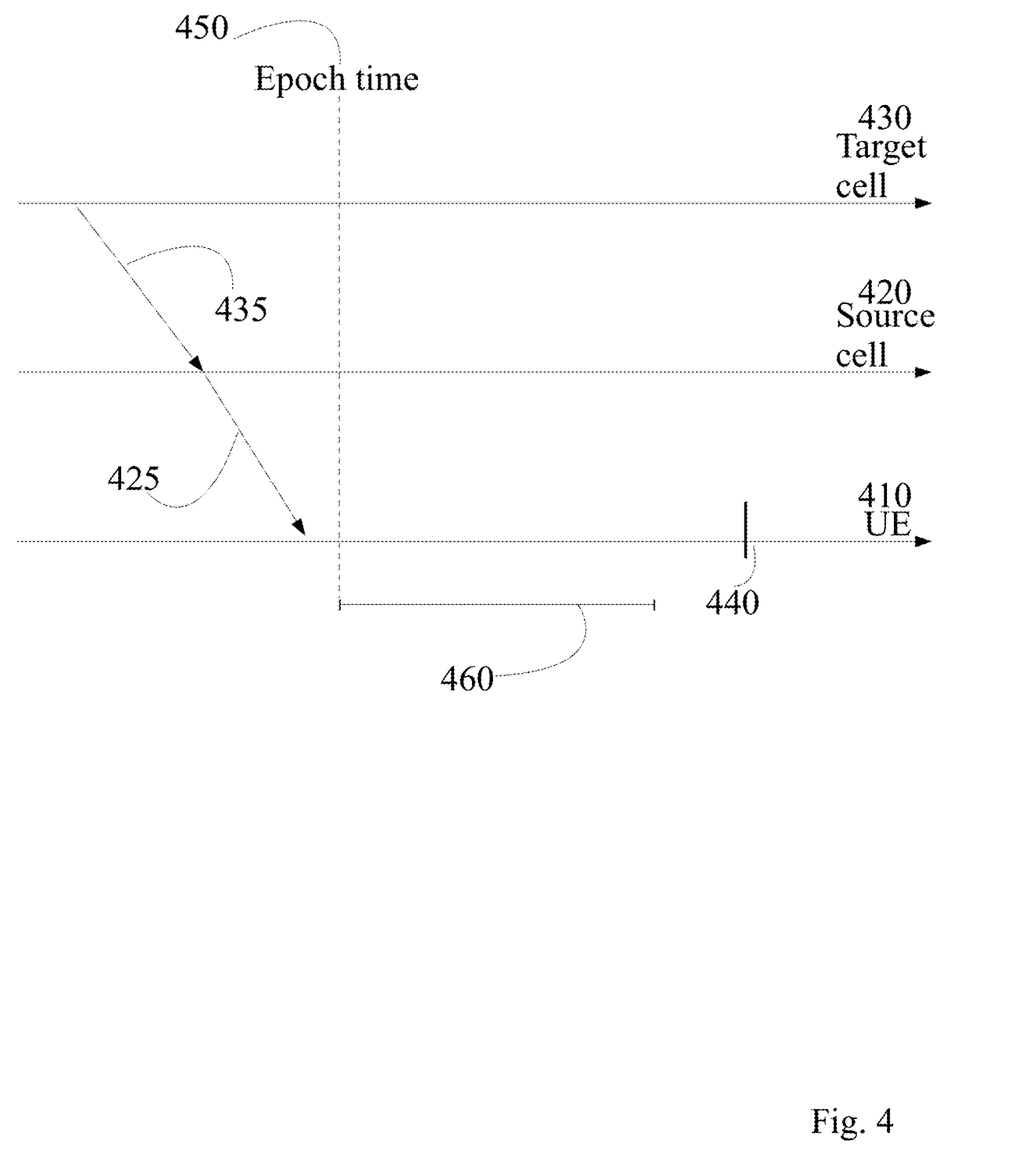
FIG. 4 shows, by way of example, a scenario of a handover procedure.

FIG. 4 shows, by way of example, a scenario of a handover procedure. A target cell 430 and a source cell 420 are associated with different satellites and may be connected to different gateways on the ground. Time advances from left to right. A target cell 430 transmits an acknowledgement 435 to a handover (HO) request to a source cell 420. The acknowledgement message may comprise the system information block comprising the satellite assistance information of the target cell 430. Thus, the acknowledgement message may comprise information on satellite assistance information associated with the target cell 430. For example, the satellite assistance information may comprise an epoch time 450.

The source cell 420 transmits radio resource control (RRC) reconfiguration 425 to the UE 410. The configuration message comprises at least the satellite assistance information with epoch time 450. When the UE 410 receives the configuration, the content, e.g. the SIB transmitted by the target cell along with the HO request acknowledgement, may have aged dozens or hundreds of ms.

In this example, epoch time 450 has not passed before completion of processing of the configuration message, but the validity timer duration 460 is not long enough. The conditions of CHO are met 440 after expiry of a validity timer, and therefore, the UE 410 does not have a valid ephemeris anymore when the conditions are met.

Methods are provided to reduce the interruption time of transmissions by the UE in a handover procedure from a source cell to a target cell, which are associated with different satellite assistance information.

Figure 5:
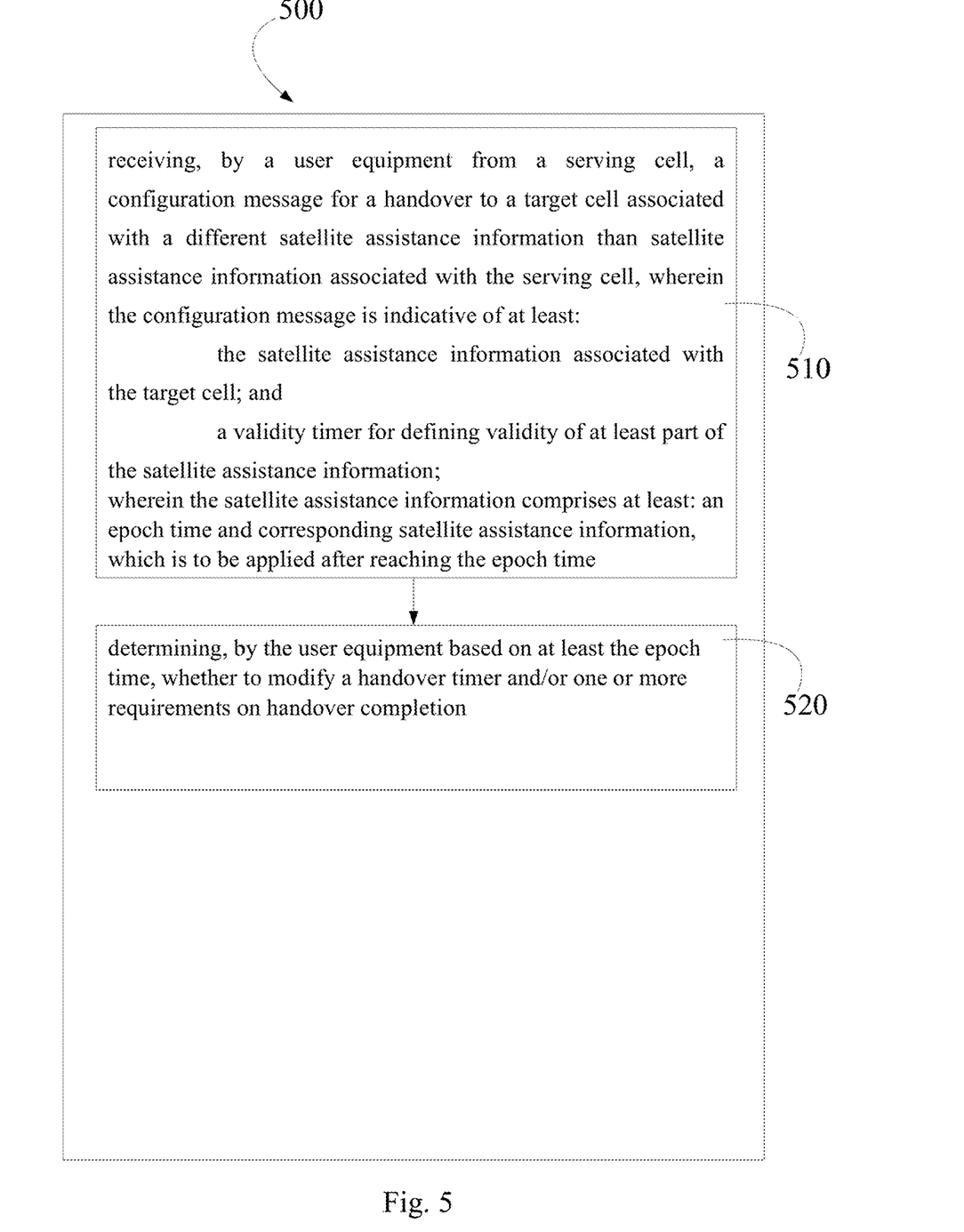
FIG. 5 shows, by way of example, a flowchart of a method.

FIG. 5 shows, by way of example, a flowchart of a method. The phases of the illustrated method may be performed by a UE, or by a control device configured to control the functioning thereof, when installed therein. The UE may be, for example, the device 610 of FIG. 6, which is configured to perform at least the method 500. The method 500 comprises receiving 510, by a user equipment from a serving cell, a configuration message for a handover to a target cell associated with a different satellite assistance information than satellite assistance information associated with the serving cell. The configuration message is indicative of at least: the satellite assistance information associated with the target cell; and a validity timer for defining validity of at least part of the satellite assistance information. The satellite assistance information comprises at least: an epoch time and corresponding satellite assistance information, which is to be applied after reaching the epoch time. The method 500 comprises determining 520, by the user equipment based on at least the epoch time, whether to modify a handover timer and/or one or more requirements on handover completion.

A handover timer specifies, or is related to, interruption time of transmissions during handover execution. For example, the handover timer may be a T304 timer. The T304 timer gives the maximum time until which UE shall have successfully completed the RACH with the target cell. The interruption time defines the latest time point until which UE should transmit RACH to the target cell.

The UE may determine, based on the epoch time, to modify the handover timer. In other words, the requirement on handover completion may be modified based on the epoch time. Modifying the handover timer may comprise starting the timer, pausing the timer, extending the timer, postponing the timer, for example. In at least some embodiments, modifying the handover timer comprises starting the handover timer.

Figure 6:
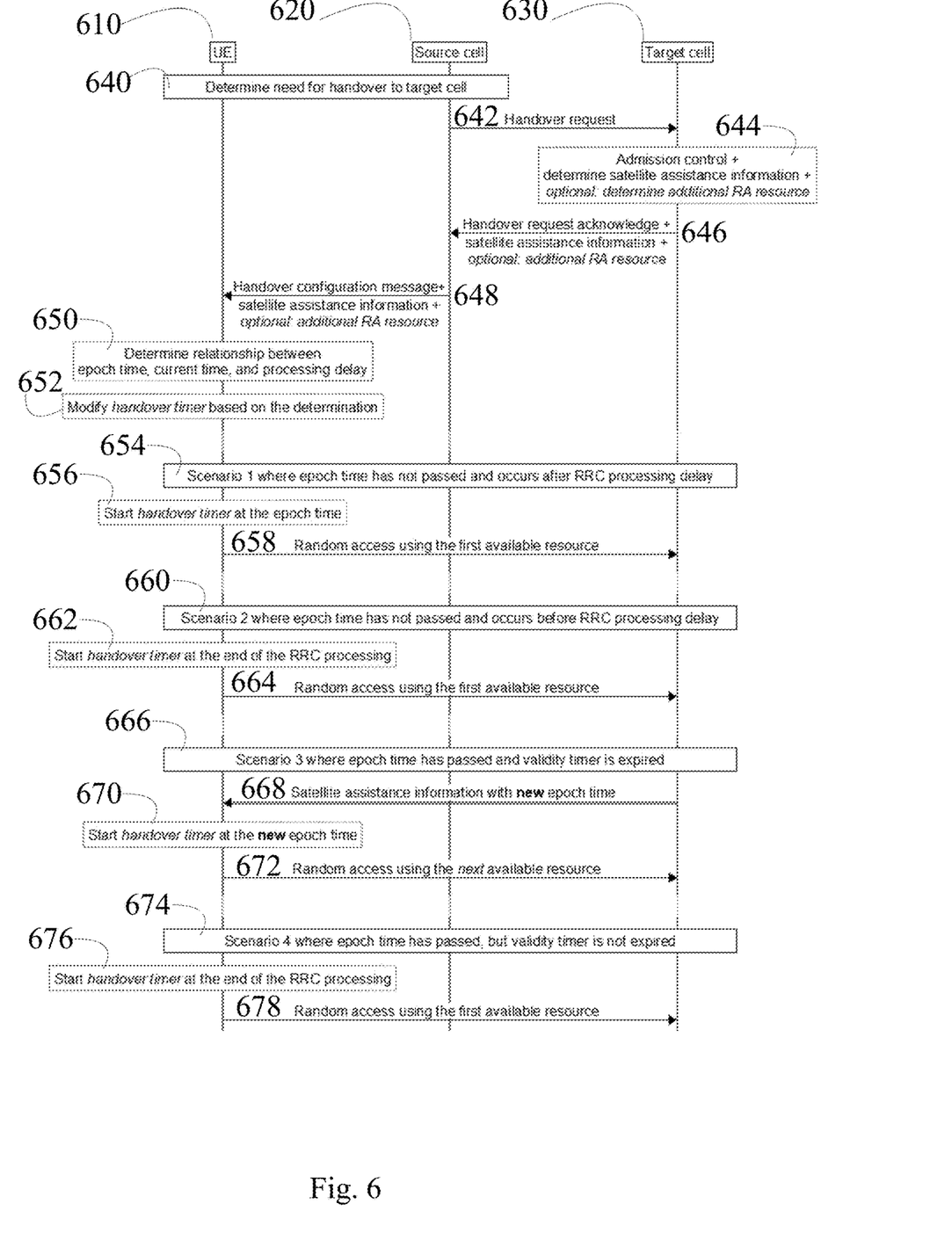
FIG. 6 shows, by way of example, signalling between entities.

FIG. 6 shows, by way of example, signalling between entities. Source cell 620 may determine 640, based on measurement reports received from UE 610, that UE is to be handed over to another cell, e.g. target cell 630. Source cell 620 transmits a handover request 642 to the target cell 630. Target cell 630 receives the handover request 642 and performs admission control and determines satellite assistance information for the UE. The target cell 630 and the source cell 620, which is the current serving cell, are associated with different satellite assistance information.

Optionally, target cell 630 may determine additional random access resource for the UE 610.

Target cell 630 transmits an acknowledgement 646 for the handover request to the source cell 620. Along with the acknowledgement message, the target cell may transmit the satellite assistance information. Optionally, the target cell 630 may transmit information on the additional RA resource to the source cell 620.

The source cell 620 transmits, to the UE 610, a configuration message 648 for a handover to the target cell. The configuration message is indicative of at least the satellite assistance information associated with the target cell and a validity timer for defining validity of at least part of the satellite assistance information. The satellite assistance information comprises at least an epoch time and corresponding satellite assistance information. The corresponding satellite assistance information is to be applied after reaching the epoch time. The corresponding satellite assistance information may comprise, for example, an ephemeris. The corresponding satellite assistance information, e.g. the ephemeris, may be valid from the epoch time until the end of the duration of the validity timer, wherein the validity timer starts at the epoch time.

The configuration message may optionally comprise information on the additional RA resource.

The UE 610 receives the configuration message 648. The UE determines, based at least on the epoch time, whether to modify a handover timer and/or one or more requirements on handover completion. The handover timer specifies, or is related to, interruption time of transmissions by the UE during handover execution. For example, the handover timer may be a T304 timer or a timer for detection of a handover failure.

The UE may determine 650 relationship between the epoch time, the current time, and the processing delay of the configuration message. Based on this determination, the UE may modify 652 the handover timer and/or one or more requirements on handover completion. Modifying the handover timer may comprise, for example, starting the timer, pausing the timer or extending the timer. Modifying the requirements may comprise, for example, relaxing the requirements, such as interruption time requirement and/or handover delay requirement. As another example, modifying the requirements may comprise modifying the starting point of measurement for the requirement, for example, postponing the starting time of measurement of the interruption time and/or handover delay.

Relaxing one or more requirements on handover completion may comprise adding a time value to the one or more requirements. For example, a time value may be added to the handover delay requirement and/or to the interruption time requirement. For example, the time value may be given in ms. For example, the time value may be configured by the network.

There may be four exemplary different scenarios of modifying the handover timer depending on the epoch time, and the relationship between the epoch time, the current time, and the processing delay of the configuration message.

In scenario 1 654, the UE determines that the epoch time has not passed yet and occurs after the RRC processing delay, or processing delay of the configuration message. In other words, the UE determines that the epoch time is a time point after the end of the processing delay of the configuration message.

Based on determining that the epoch time is the time point after the end of the processing delay of the configuration message, the UE 610 may start 656 the handover timer at the epoch time. For example, the UE 610 may postpone or extend the T304 timer. Alternatively or additionally, the UE may decide to modify the one or more requirements on handover completion, for example, by relaxing a handover delay requirement and/or interruption time requirement. As another example, modifying the requirements may comprise modifying the starting point of measurement for the requirement, for example, postponing the starting time of measurement of the interruption time and/or handover delay.

The UE 610 may initiate 658 a random access procedure with the target cell 630 using the first resource allocated in the configuration. The first resource is the earliest available resource in time of the allocated resource(s).

In scenario 2 660, the UE 610 determines that epoch time has not passed yet and occurs before the processing delay of the configuration message. In other words, the UE determines that the epoch time is a time point between a starting time of processing of the configuration message and the end of a processing delay of the configuration message.

Based on determining that the epoch time is the time point between the starting time of processing of the configuration message and the end of the processing delay of the configuration message, the UE may start 662 the handover timer at the end of processing the configuration message, or at the end of the processing delay of the configuration message. In other words, the UE may decide not to modify the handover timer and/or not to modify the one or more requirements on handover completion.

The UE 610 may initiate 664 a random access procedure with the target cell 630 using the first resource allocated in the configuration. The first resource is the earliest available resource in time of the allocated resource(s).

In scenario 3 666, the UE determines that the epoch time has already passed. In other words, the UE determines that the epoch time is a time point in the past or a time point before a starting time of processing of the configuration message. Then, the UE may determine whether the validity timer has already expired or whether the satellite assistance information is valid.

The UE may detect 666 that the validity timer has expired. In other words, the UE may detect that the satellite assistance information is not valid. Based on detecting that the validity timer has expired, the UE may receive 668 updated satellite assistance information with new epoch time, or a second epoch time. The second epoch time is later than the epoch time received previously along with the configuration. The target cell 630 may be configured to broadcast its satellite assistance information, for example, updated satellite assistance information or satellite assistance information which is up-to-date.

The UE 610 may start 670 the handover timer at the second epoch time.

Postponing the starting of the handover timer reduces the interruption time experienced by the UE. For example, the UE 610 may postpone or extend the T304 timer. Alternatively or additionally, the UE may modify the one or more requirements on handover completion, for example, by relaxing the handover delay requirement and/or interruption time requirement. As another example, modifying the requirements may comprise modifying the starting point of measurement for the requirement, for example, postponing the starting time of measurement of the interruption time and/or handover delay.

The UE 610 may initiate 672 a random access procedure with the target cell 630 using the next available resource. The next available resource may be a resource allocated in the configuration, which is a later resource in time than the first resource, which is the earliest resource in time of the allocated resources.

In scenario 4 674, the UE determines that the epoch time has already passed. In other words, the UE determines that the epoch time is a time point in the past or a time point before a starting time of processing of the configuration message. Then, the UE may determine whether the validity timer has already expired or whether the satellite assistance information is valid.

The UE may detect 674 that the validity timer has not expired. In other words, the UE may detect that the satellite assistance information is valid. Based on detecting that the validity timer has not expired, the UE may start 676 the handover timer at the end of processing of the configuration message. In other words, the UE may decide not to modify the handover timer and/or not to modify the one or more requirements on handover completion. The UE 610 may initiate 678 a random access procedure with the target cell 630 using the first resource allocated in the configuration. The first resource is the earliest available resource in time of the allocated resource(s).

The method as disclosed herein may reduce the interruption time of the UE, or at least prevent increasing the interruption time, while maintaining consistency with the satellite assistance information, e.g. ephemeris information and validity timers. In a scenario, where the UE acquires new satellite assistance information from the target cell, the extra time required may be minimized.

The handover delay, for example Dhandover, may equal the RRC command delay plus the interruption time. The interruption time may be the time between the end of the last tansmission time interval (TTI) comprising the RRC configuration on the old physical downlink shared channel (PDSCH) and the time the UE starts transmission of the new physical random access channel (PRACH), excluding the processing delay of the RRC configuration. The RRC command delay may be defined as the largest value of: the processing delay of the RRC configuration; delay between the end of the last transmission time interval (TTI) comprising the RRC configuration and the epoch time provided in the RRC configuration.

Figure 7:
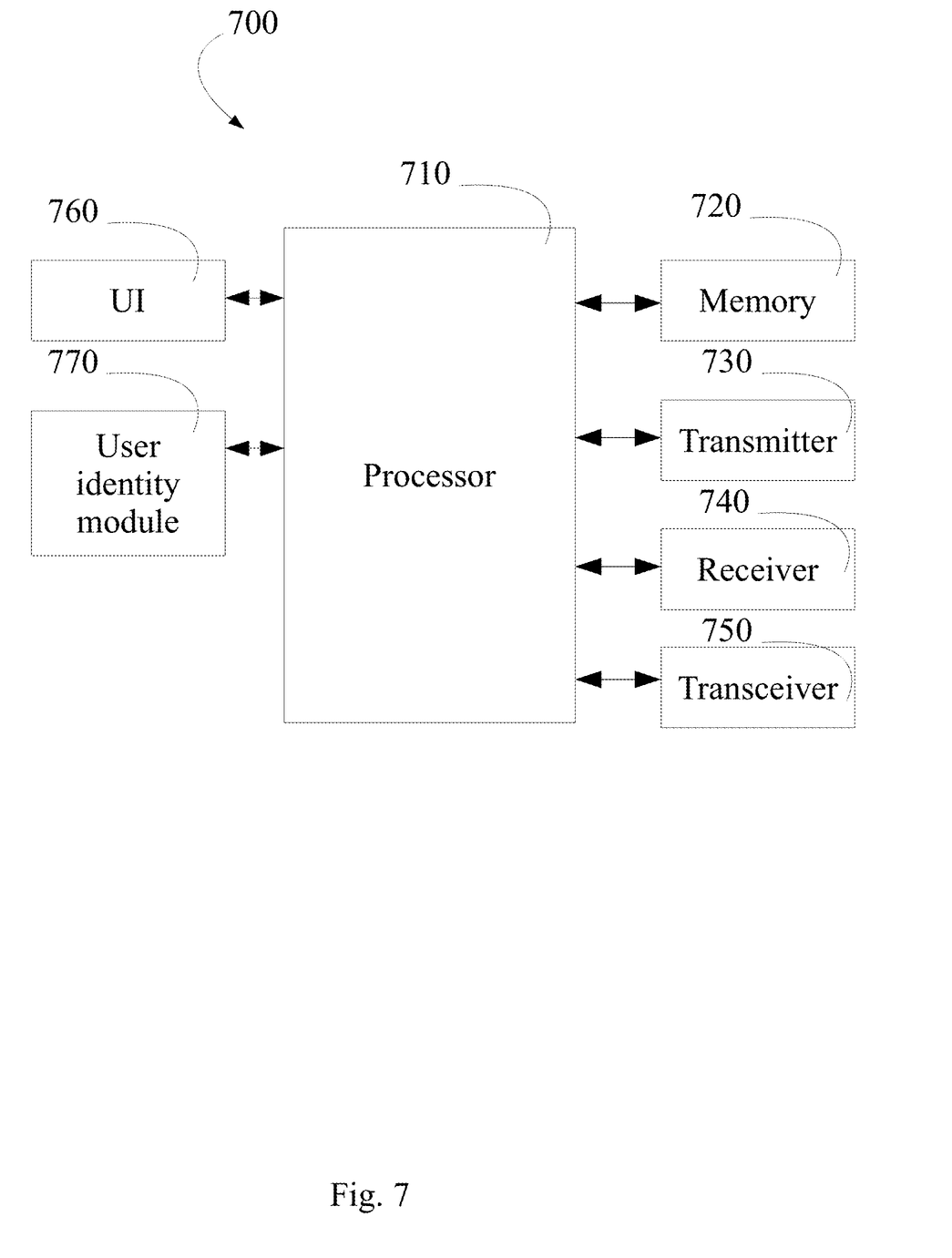
FIG. 7 shows, by way of example, a block diagram of an apparatus.

FIG. 7 shows, by way of example, a block diagram of an apparatus capable of performing at least one or more methods as disclosed herein. Illustrated is device 700, which may comprise, for example, a mobile communication device such as mobile or UE 100 of FIG. 1 or UE 610 of FIG. 6. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core designed by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise instructions, such as computer instructions or computer program code, that processor 710 is configured to execute. When instructions configured to cause processor 710 to perform certain actions are stored in memory 720, and device 700 overall is configured to run under the direction of processor 710 using instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a subscriber identity module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Device 700 may comprise further devices not illustrated in FIG. 7. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint sensor arranged to authenticate, at least in part, a user of device 700. In some example embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. User equipment comprising: at least one processor; and
   at least one memory storing instructions that, when executed by the at least one processor, cause the user equipment at least to perform:
   receiving, from a serving cell, a configuration message for a handover to a target cell associated with a satellite assistance information, wherein the configuration message is indicative of at least:
   the satellite assistance information associated with the target cell; and a validity timer for defining validity of at least part of the satellite assistance information;
   wherein the satellite assistance information comprises an epoch time and an ephemeris, wherein the satellite assistance information is to be applied after reaching the epoch time, wherein the validity timer defines how long the satellite assistance information is valid from the epoch time;

determining that the epoch time is a time point in the past;

based on the determining that the epoch time is the time point in the past, determining whether the satellite assistance information is valid;

detecting that the satellite assistance information is not valid;

based on detecting that the satellite assistance information is not valid, receiving updated satellite assistance information with a second epoch time; and modifying one or more requirements on handover completion by:

relaxing a handover delay requirement and/or interruption time requirement;

and/or modifying a starting time of measurement of a handover delay and/or an interruption time.

2. The user equipment of claim 1, caused to perform: detecting that the satellite assistance information is not valid; based on detecting that the satellite assistance information is not valid, receiving updated satellite assistance information with a second epoch time; and starting the handover timer at the second epoch time.

3. The user equipment of claim 2, caused to perform: initiating a random access procedure with the target cell using a resource allocated in the configuration, which is a later resource in time than a first resource, which is the earliest resource in time of the allocated resources.

4. The user equipment of claim 1, caused to perform: detecting that the satellite assistance information is valid; based on detecting that the satellite assistance information is valid, starting the handover timer at the end of processing the configuration message.

5. The user equipment of claim 1, caused to perform: determining that the epoch time is a time point between a starting time of processing of the configuration message and the end of a processing delay of the configuration message;

based on determining that the epoch time is the time point between the starting time of processing of the configuration message and the end of the processing delay of the configuration message, detecting that the satellite assistance information is valid; and starting the handover timer at the end of processing the configuration message or at the end of the processing delay of the configuration message.

6. The user equipment of claim 1, caused to perform: determining that the epoch time is a time point after the end of a processing delay of the configuration message;

based on determining that the epoch time is the time point after the end of the processing delay of the configuration message, starting the handover timer at the epoch time.

7. The user equipment of claim 1, caused to perform: determining that the epoch time is a time point after the end of a processing delay of the configuration message;

based on determining that the epoch time is the time point after the end of the processing delay of the configuration message, modifying one or more requirements on handover completion by:

relaxing a handover delay requirement and/or interruption time requirement; and/or modifying a starting time of measurement of a handover delay and/or an interruption time.

8. The user equipment of claim 7, wherein the relaxing the handover delay requirement comprises adding a time value to the handover delay requirement; and/or wherein the relaxing the interruption time requirement comprises adding a time value to the interruption time requirement.

9. The user equipment of claim 5, caused to perform: initiating a random access procedure with the target cell using a first resource allocated in the configuration, wherein the first resource is the earliest available resource in time of the allocated resource(s).

10. The user equipment of claim 1, wherein the configuration message is indicative of random access channel configuration comprising a first resource and a second resource, which is later resource in time than the first resource.

11. An access node of a serving cell for user equipment, comprising: at least one processor; and at least one memory storing instructions that, when executed by the at least one processor, cause the access node at least to perform:

receiving, from a target cell, an acknowledgement for a handover request, wherein the acknowledgement is indicative of at least:

a random access channel configuration comprising a first resource and optionally a second resource, which is later resource in time than the first resource;

a satellite assistance information associated with the target cell; and a validity timer for defining validity of at least part of the satellite assistance information;

wherein the satellite assistance information comprises an epoch time and an ephemeris, wherein the satellite assistance information is to be applied after reaching the epoch time, wherein the validity timer defines how long the satellite assistance information is valid from the epoch time, and wherein the epoch time is to be used by a user equipment served by the access node to at least modify a handover timer;

transmitting, to the user equipment served by the access node, a configuration message for a handover to the target cell, wherein the configuration message is indicative of at least: the random access channel configuration; the satellite assistance information; and the validity timer.

12. A method performed by a user equipment comprising: receiving, by the user equipment from an access node of a serving cell, a configuration message for a handover to a target cell associated with a satellite assistance information, wherein the configuration message is indicative of at least:

the satellite assistance information associated with the target cell; and a validity timer for defining validity of at least part of the satellite assistance information;

wherein the satellite assistance information comprises an epoch time and an ephemeris, wherein the satellite assistance information is to be applied after reaching the epoch time, wherein the validity timer defines how long the satellite assistance information is valid from the epoch time;

determining that the epoch time is a time point in the past;

based on the determining a that the epoch time is the time point in the past, determining a whether the satellite assistance information is valid;

detecting that the satellite assistance information is not valid;

based on detecting a that the satellite assistance information is not valid, receiving updated satellite assistance information with a second epoch time; and modifying a one or more requirements on handover completion by:

relaxing a handover delay requirement and/or interruption time requirement; and/or modifying a starting a time of measurement of a handover delay and/or an interruption time.

13. The method of claim 12, comprising: detecting that the satellite assistance information is not valid; based on detecting that the satellite assistance information is not valid, receiving updated satellite assistance information with a second epoch time; and starting the handover timer at the second epoch time.

14. The method of claim 13, comprising: initiating a random access procedure with the target cell using a resource allocated in the configuration, which is a later resource in time than a first resource, which is the earliest resource in time of the allocated resources.

15. The method of claim 12, comprising: detecting that the satellite assistance information is valid; based on detecting that the satellite assistance information is valid, starting the handover timer at the end of processing the configuration message.

16. The method of claim 12, comprising: determining that the epoch time is a time point between a starting time of processing of the configuration message and the end of a processing delay of the configuration message;

based on determining that the epoch time is the time point between the starting time of processing of the configuration message and the end of the processing delay of the configuration message, detecting that the satellite assistance information is valid; and starting the handover timer at the end of processing the configuration message or at the end of the processing delay of the configuration message.

* * * * *